United States Patent [19]

Romano

[11] Patent Number: 4,974,469
[45] Date of Patent: Dec. 4, 1990

[54] SUPPORT FOR THE BRAKE-OPERATING LEVER AND THE GEAR-OPERATING LEVER OF BICYCLES AND THE LIKE

[75] Inventor: Antonio Romano, Padova, Italy

[73] Assignee: Campagnolo S.r.l., Vicenza, Italy

[21] Appl. No.: 358,052

[22] Filed: May 30, 1989

[30] Foreign Application Priority Data

Jun. 6, 1988 [IT] Italy ................. 67519 A/88

[51] Int. Cl.⁵ .................. F16C 1/10; G05G 11/00
[52] U.S. Cl. ..................... 74/502.2; 74/489
[58] Field of Search ............ 74/489, 488, 502.2, 74/501.5 R; 192/4 R, 4 A

[56] References Cited

U.S. PATENT DOCUMENTS

| 4,100,820 | 7/1978 | Evett | 74/489 |
| 4,132,296 | 1/1979 | Evett | 192/4 R |
| 4,532,825 | 8/1985 | Nagano | 74/502.2 X |
| 4,674,353 | 6/1987 | Yoshigai | 74/489 |

FOREIGN PATENT DOCUMENTS

| 963495 | 4/1957 | Fed. Rep. of Germany | 74/489 |
| 3136922 | 3/1983 | Fed. Rep. of Germany | 74/489 |
| 723819 | 4/1932 | France | 74/502.2 |
| 927317 | 10/1947 | France | 74/489 |
| 478734 | 3/1953 | Italy | 74/489 |
| 1008052 | 10/1965 | United Kingdom | 74/502.2 |

Primary Examiner—Vinh T. Luong
Attorney, Agent, or Firm—Sughrue, Mion, Zinn, Macpeak & Seas

[57] ABSTRACT

A support for brake-operating levers adapted for connection to a handlebar of a bicycle includes a pin for the articulation of an operating lever for the front or rear derailer, which is mounted on an auxiliary body whose position is adjustable relative to the support. The auxiliary body may be connected to a lever support mounted on the handlebars in a configuration such that the operating lever is placed above or below the median plane of the support.

5 Claims, 2 Drawing Sheets

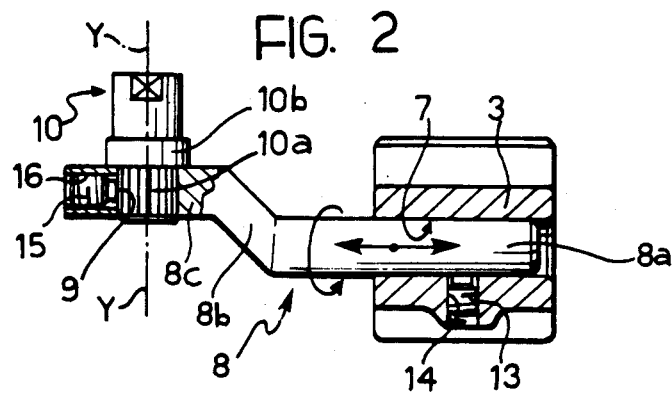
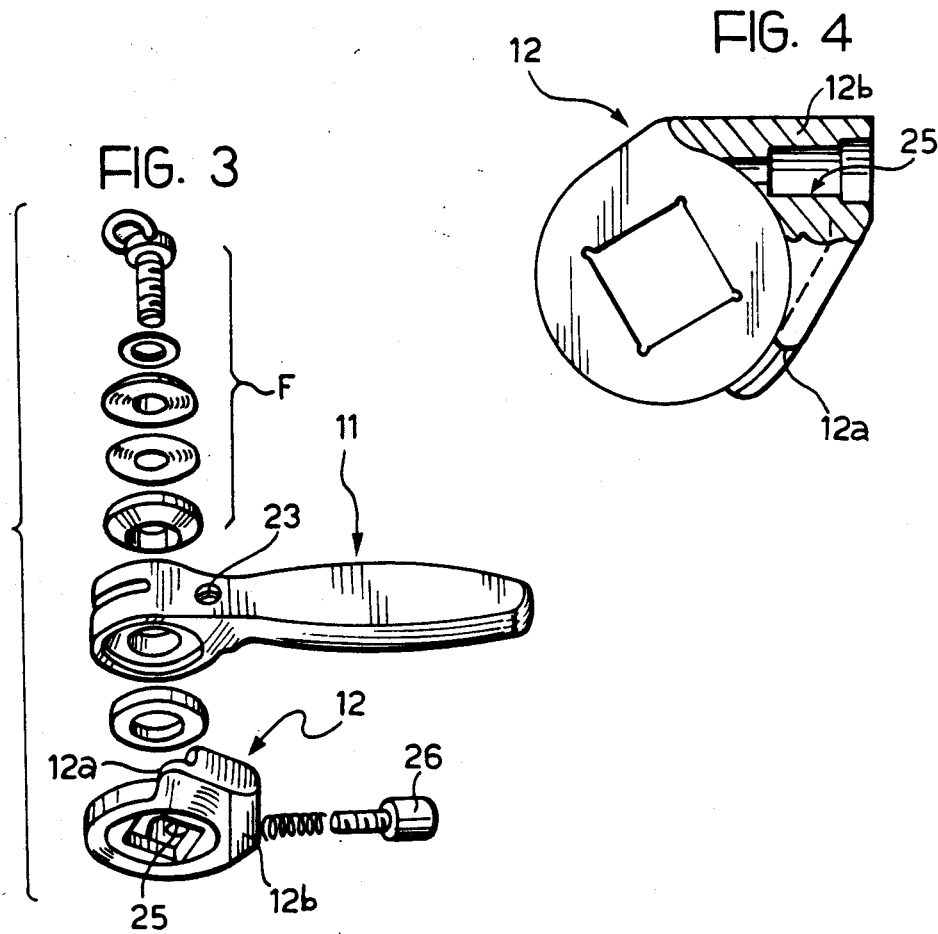

200~# SUPPORT FOR THE BRAKE-OPERATING LEVER AND THE GEAR-OPERATING LEVER OF BICYCLES AND THE LIKE

BACKGROUND OF THE INVENTION

The present invention relates to a support for brake-operating levers of bicycles and the like, comprising a body adapted to be connected to a handlebar, a pin which is connected to the body and on which a lever for operating the front or rear derailer is articulated, and means for adjusting the position of the pin relative to the body.

SUMMARY OF THE INVENTION

The object of the present invention is to provide a support of the type specified above, which is simple and economical to produce and which permits a wide range of adjustment by the user.

According to the invention, this object is achieved by virtue of the fact that the pin of the lever for operating the front or rear derailer is mounted on an auxiliary support provided with a rod which is substantially perpendicular to the pin and is slidably and rotatably mounted in a seat of the body, means being provided for locking the rod in a predetermined position relative to the body.

By virtue of these characteristics, it is possible to mount the auxiliary support on the body of the support in a configuration which ensures that the lever can pivot above or below the median plane of the handlebar, in addition to the possible adjustment of both the distance of the derailer-operating lever from the grip, and the inclination of the lever to the support body.

A further object of the present invention is to provide a support in which the brake lever is provided with a resilient return which is independent of the pulling action of the brake-operating cable.

This is achieved by virtue of the fact that resilient means are interposed between the brake-operating lever and the body to ensure the return of the lever even without the pull of the cable. By virtue of this further characteristic, the connection of the cable during assembly is facilitated, moreover, dangerous contact of the brake lever against the finger of the user is avoided in the event of a breakage of the cable.

BRIEF DESCRIPTION OF THE DRAWINGS

Further characteristics and advantages of the support according to the invention will become clear from the detailed description which follows with reference to the appended drawings, provided by way of non-limiting example, in which:

FIG. 2 is a section taken on the line II—II of FIG. 1, FIG. 3 is an exploded perspective view of a gear-operating lever adapted for installation on the support of FIG. 1, and FIG. 4 is a partially-sectioned plan view of a detail of FIG. 3.

DETAILED DESCRIPTION OF THE INVENTION

Figure 1:
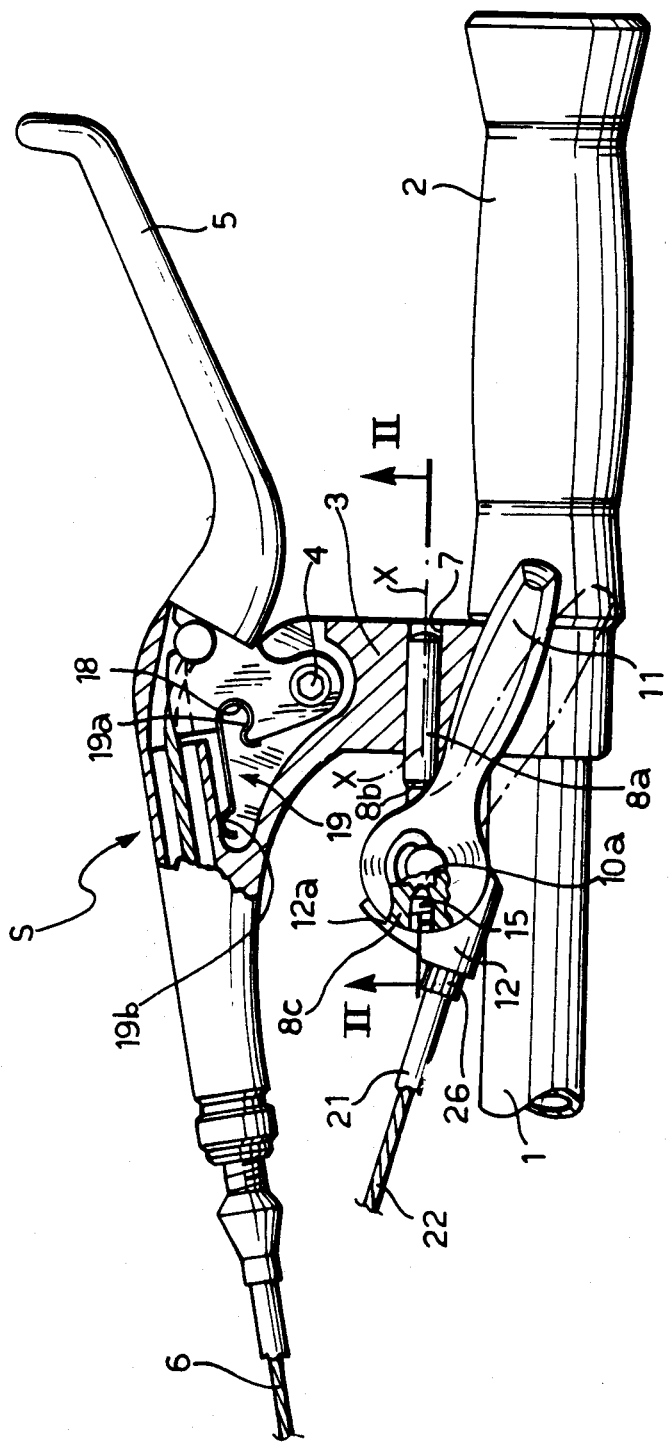
FIG. 1 is a partially-sectioned view of a support according to the invention fitted to the handlebar of a bicycle.

With reference to the drawings, a handlebar of a mountain bicycle, of the type in which the levers for operating the front and rear brakes are arranged substantially in the same horizontal plane as the handlebar, is indicated 1.

A grip 2 is fitted to one end of the handlebar 1 and a support S provided with a body 3 to which a lever 5 for operating a flexible brake cable 6 is articulated at 4 is connected next to it in known manner, for example, by means of a clip.

The body 3 has a through-hole 7 with an axis X—X substantially parallel to the axis of the handlebar 1, in which a rod 8a of an auxiliary support 8 is slidably and rotatably mounted. The latter has a central portion 8b inclined to the rod 8a and an end 8c opposite the rod 8a and provided with a through-hole 9 having an axis Y—Y substantially perpendicular to the axis X—X of the through-hole 7. The hole 9 of the auxiliary support 8 has a notched periphery complementary to a notched outer surface portion 10a of a pin to which a lever 11 for operating a front or rear derailer of the bicycle gears is articulated. The pin 10 has a polygonal central portion 10b onto which is keyed a shaped element 12 having a stop portion 12a adapted to act as a travel limit for the rotation of the lever 11. The latter has a friction device F of known type for enabling it to be locked in a particular angular position appropriate to a particular ratio. Obviously the device F may be of a different type, for example, of the indexed type. The shaped element 12 keyed onto the polygonal portion 10b of the pin 10 also has an abutment 12b for the end of a sheath 21 of a flexible cable 22 for operating a derailer, the end of which is connected to the lever 11 at 23. The abutment 12 has a partially-threaded hole 25 into which a bush 26 for the adjustment of the sheath 21 is screwed.

The position of the rod 8a of the auxiliary structure 8 can be locked relative to the body 3 by means of a grub screw 13 screwed into a corresponding threaded seat 14 having an axis perpendicular and incident to the axis X—X of the rod 8a. Similarly, the pin 10 is prevented from coming out of the body 3 by a grub screw 15 screwed into a corresponding seat 16 having an axis perpendicular and incident to the axis Y—Y of the pin.

It is clear that, by slackening the grub screws 13 and 15, the user can vary the distance of the gear-operating lever from the grip 2, the inclination of the axis of rotation Y—Y of the lever 11 relative to the handlebar 1, and finally the end-of-travel position of the lever 11 which determines the successive angular positions of the lever corresponding to the various ratios. The particular conformation of the auxiliary support 8 also enables the operating lever for the front or rear derailer to be mounted beneath or above the median plane defined by the handlebar 1 and the lever 5, so that the user's hand can engage the lever in a wide range of configurations.

According to another characteristic of the invention, the brake-operating lever 5 has a seat 18 which resiliently houses one end 19a of a flat spring 19 having a second end 19b acting on a portion of the body 3 of the support. It is clear that, by acting on the brake-operating lever 5, the user causes the resilient deformation of the flat spring 19 and tends to bias the lever 5 into the position shown in FIG. 1. The lever 5 is therefore kept in its extended position, even without the pulling action of the flexible cable 6, due to the return spring of the brake.

I claim:

1. A brake and derailer operating assembly comprising a support body adapted to be mounted on a handlebar,
   a brake operating lever pivotally mounted on said support body,
   a first hole in said support body,
   a rod having a first end slidably and rotatably mounted in said hole for adjusting the position of said rod relative to said support body,
   locking means for locking said rod in an adjusted position relative to said support body, said rod having a second end opposite said first end, a pin secured to said second end of said rod and disposed perpendicular thereto and
   a derailer operating lever mounted on said pin for rotation relative to said pin.

2. An assembly according to claim 1 wherein said pin has a first portion and a second portion, limit means mounted on said first portion to limit rotation of said derailer operating lever, a second hole disposed in said second end of said rod and having a notched peripheral surface, said second portion of said pin having a notched outer surface complementary to said notched periphery of said second hole for enabling adjustment of the angular position of said pin relative to said rod.

3. An assembly according to claim 1 wherein said locking means comprises a threaded hole in said body perpendicular to said first hole and screw means threaded into said threaded hole for engagement with said rod disposed in said first hole.

4. An assembly according to claim 1 further comprising a flexible operating cable connected to said brake operating lever and resilient means interposed between said brake operating lever and said support body for returning said brake operating lever independent of forces acting on said cable.

5. An assembly according to claim 4, wherein said resilient means comprises a flat spring having a first end portion connected to said brake operating lever and a second end portion acting on said support body.

* * * * *